United States Patent
Chan et al.

(10) Patent No.: US 10,824,436 B2
(45) Date of Patent: Nov. 3, 2020

(54) HYBRID CONFIGURATION MANAGEMENT USING BOOTLOADER TRANSLATION

(71) Applicant: ATI TECHNOLOGIES ULC, Markham (CA)

(72) Inventors: Benjamin Koon Pan Chan, Markham (CA); William Lloyd Atkinson, Markham (CA)

(73) Assignee: ATI TECHNOLOGIES ULC, Markham (CA)

(*) Notice: Subject to any disclaimer, the term of this patent is extended or adjusted under 35 U.S.C. 154(b) by 138 days.

(21) Appl. No.: 16/219,273

(22) Filed: Dec. 13, 2018

(65) Prior Publication Data

US 2020/0192679 A1 Jun. 18, 2020

(51) Int. Cl.
G06F 9/44 (2018.01)
G06F 9/4401 (2018.01)
G06F 9/38 (2018.01)
G06F 9/445 (2018.01)
G06F 9/50 (2006.01)

(52) U.S. Cl.
CPC .......... *G06F 9/4408* (2013.01); *G06F 9/3877* (2013.01); *G06F 9/4411* (2013.01); *G06F 9/44505* (2013.01); *G06F 9/5055* (2013.01); *G06F 9/5072* (2013.01)

(58) Field of Classification Search
CPC combination set(s) only.
See application file for complete search history.

(56) References Cited

U.S. PATENT DOCUMENTS

| | | | |
|---|---|---|---|
| 2002/0169951 A1* | 11/2002 | Zimmer | G06F 9/4812 713/100 |
| 2004/0268108 A1* | 12/2004 | Chen | G06F 9/4405 713/1 |
| 2006/0064528 A1* | 3/2006 | Soltis, Jr. | G06F 13/24 710/260 |
| 2007/0220241 A1* | 9/2007 | Rothman | G06F 12/0223 713/1 |
| 2007/0300055 A1* | 12/2007 | Sip | G06F 9/4401 713/2 |
| 2010/0275206 A1* | 10/2010 | Mewhinney | G06F 9/5033 718/100 |
| 2013/0111556 A1* | 5/2013 | Matsimanis | H04L 12/6418 726/4 |
| 2014/0215016 A1* | 7/2014 | Ke | G06F 3/00 709/217 |

* cited by examiner

*Primary Examiner* — Zahid Choudhury

(57) ABSTRACT

A hybrid co-processing system including both complex instruction set computer (CISC) architecture-based processing clusters and reduced instruction set computer (RISC) architecture-based processing clusters includes a parser to derive from a hardware configuration specific to the CISC architecture, such as an ACPI table, a device tree specific to the RISC architecture for booting. The hardware configuration information indicated by the device tree is specific to the RISC architecture, and in different cases includes more, less, or revised information than a corresponding ACPI table for the same hybrid co-processing system.

20 Claims, 3 Drawing Sheets

HYBRID CONFIGURATION MANAGEMENT USING BOOTLOADER TRANSLATION

BACKGROUND

High performance processing systems use processor cores to execute software programs to perform designated services, such as file management, database management, document printing management, web page storage, computer game services, graphics processing, computer vision, and the like, or a combination thereof. Conventional processing systems include clusters of processor cores that follow either a complex instruction set computer (CISC) architecture or a reduced instruction set computer (RISC) architecture. During a bootstrap process (referred to as a "boot") each cluster of processor cores executes local firmware to configure the processor cores for operation based on a set of configuration parameters. This allows each cluster of processor cores to be individually configured by adjusting the configuration parameters for each cluster. However, because the CISC architecture and the RISC architecture employ different configuration parameters, booting processing systems incorporating clusters of processor cores with both CISC architecture and RISC architecture can be an inefficient process.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
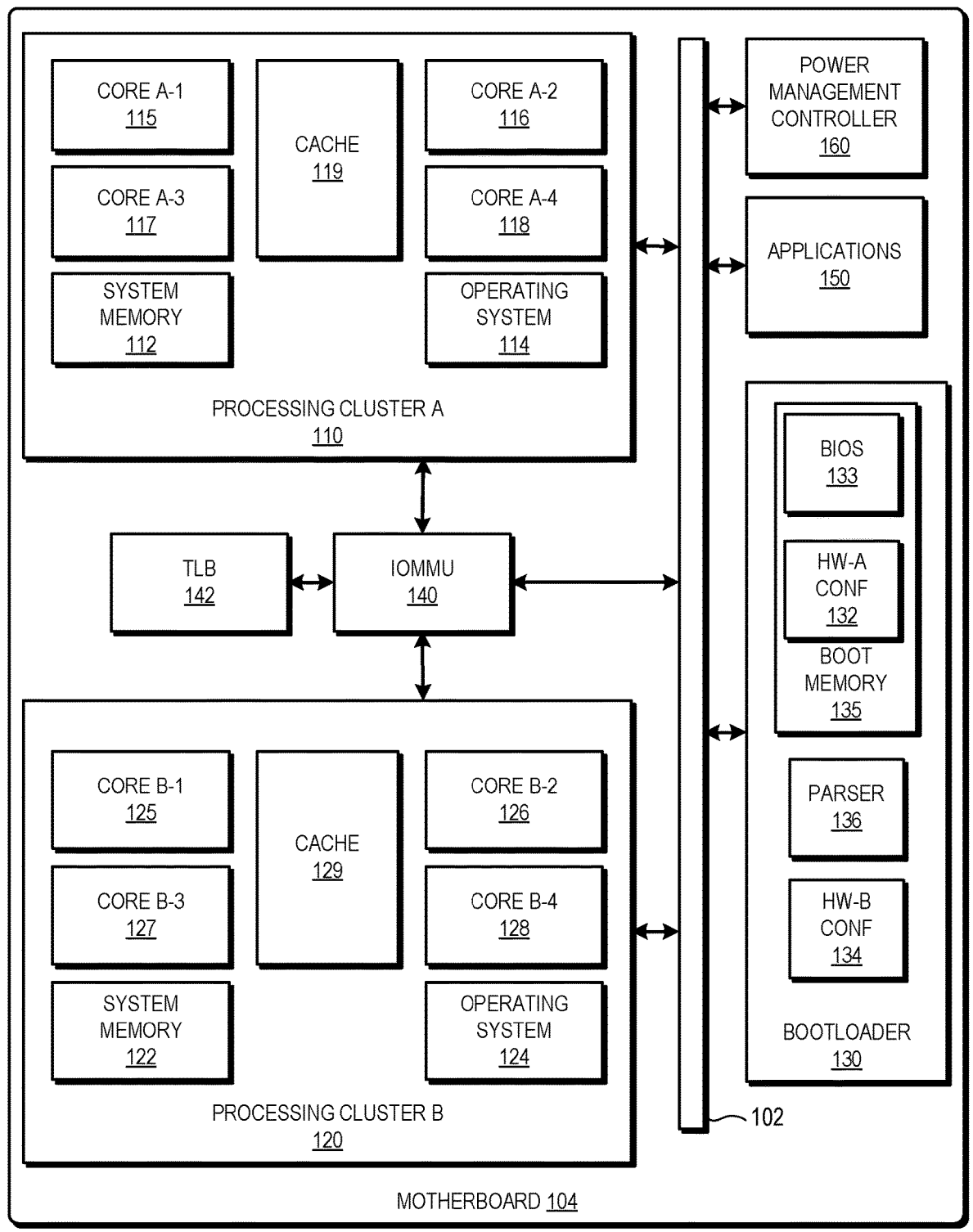
FIG. 1 is a block diagram of a processing system including a bootloader configured to boot a cluster of CISC architecture-based processors and a cluster of RISC architecture-based processors in accordance with some embodiments.
Figure 2:
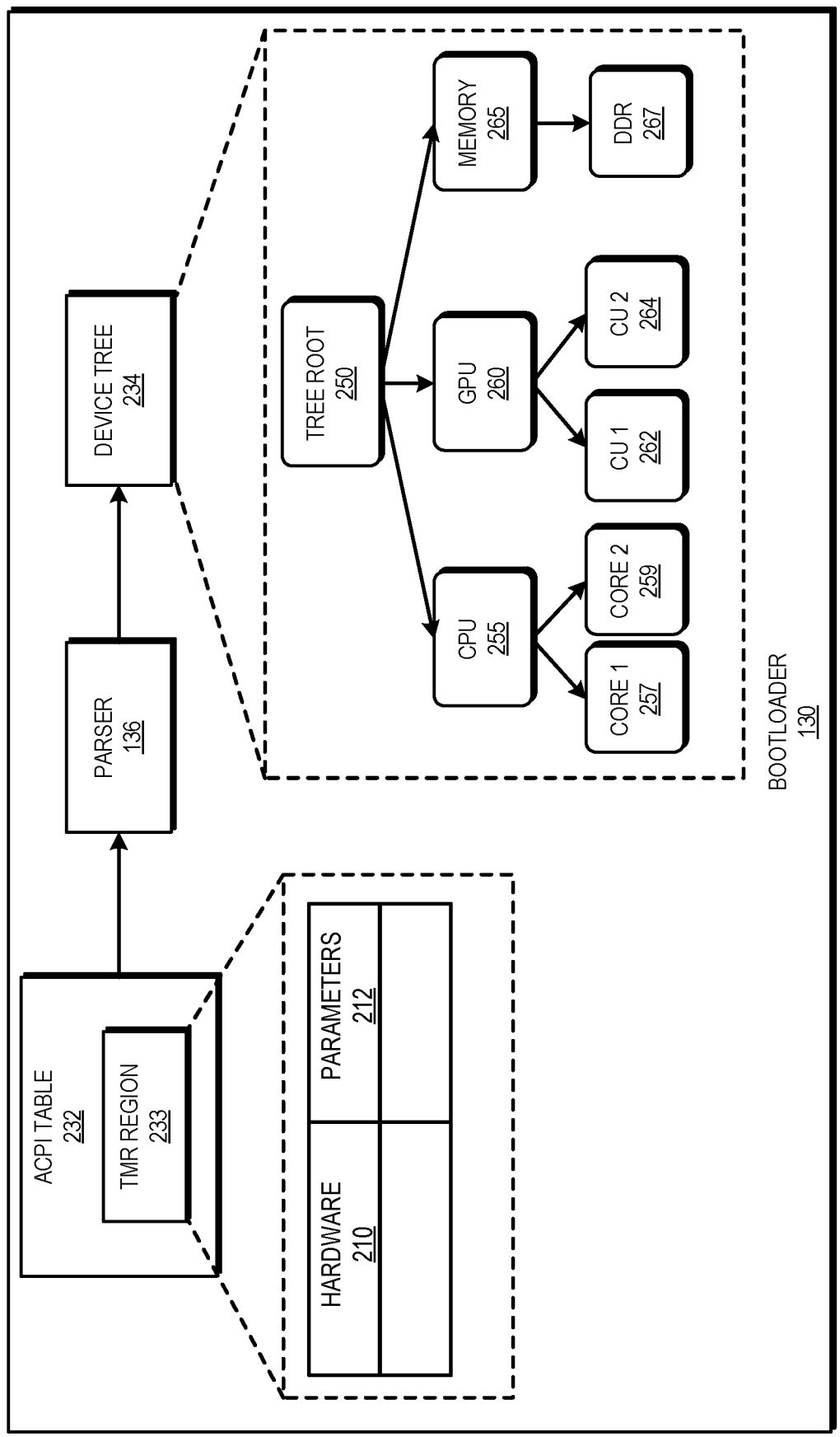
FIG. 2 is a block diagram of the bootloader of FIG. 1 including a parser in accordance with some embodiments.
Figure 3:
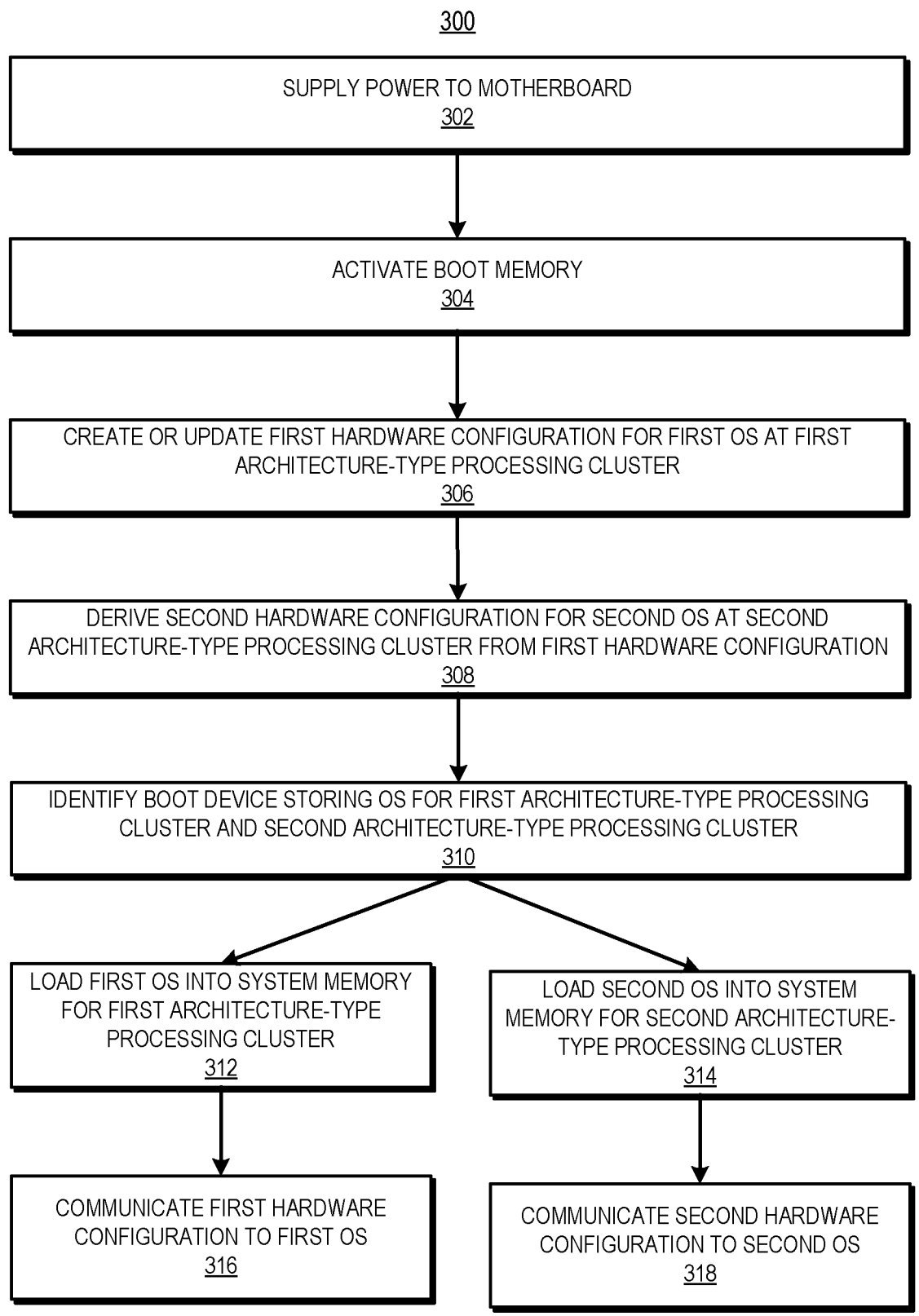
FIG. 3 is a flow diagram illustrating a method for booting a hybrid co-processing system in accordance with some embodiments.

FIGS. 1-3 illustrate example techniques for booting a hybrid co-processing system including both CISC architecture-based processing clusters and RISC architecture-based processing clusters by parsing a hardware configuration specific to the CISC architecture to a device tree specific to the RISC architecture. In the context of the hybrid co-processing system, both the CISC architecture-based processing clusters and RISC architecture-based processing clusters run high-level operating systems (OSs) such as Linux or Windows. A CISC architecture-based processing cluster derives hardware configuration information for booting from an advanced configuration and power interface (ACPI) table, whereas a RISC architecture-based processing cluster derives hardware configuration information for booting from a device tree. The hardware configuration information indicated by the device tree is specific to the RISC architecture, and in different cases includes more, less, or revised information than a corresponding ACPI table for the same processing system. If the ACPI table were used for booting both the CISC architecture-based processing clusters and the RISC architecture-based processing clusters, the ACPI table would introduce unnecessary constraints on the OS running on the RISC architecture-based processing clusters.

During the boot process, a bootloader creates or updates an ACPI table to provide a hardware configuration specific to the CISC architecture-based processing clusters (referred to as x86-based processing clusters) to an operating system (OS) executing at the x86-based processing clusters. The bootloader includes a parser to translate the ACPI table into a device tree that provides a hardware configuration specific to the RISC architecture-based processing clusters (referred to as ARM-based processing clusters) to an OS executing at the ARM-based processing clusters. In some embodiments, the ACPI table includes a trusted memory region (TMR) that is only applicable to the OS executing at the ARM-based processing clusters. The parser accesses the TMR of the ACPI to generate a device node in the device tree, and the TMR is not exposed to the OS executing at the x86-based processing clusters. By leveraging the hardware configuration information already created or stored at the ACPI table and adapting the hardware configuration into a device tree that includes hardware configuration information specific to an ARM-based processing cluster, the bootloader efficiently boots both the x86-based processing clusters and the ARM-based processing clusters.

FIG. 1 is a block diagram of a hybrid co-processing system 100 including a bootloader 130 configured to boot a first processing cluster A 110 including processor cores having a first architecture type and a second processing cluster B 120 including processor cores having a second architecture type in accordance with some embodiments. In some embodiments, the first processing cluster A 110 includes a cluster of processors implementing a CISC instruction set architecture, such as an x86 instruction set architecture, and the second processing cluster B 120 includes a cluster of processors implementing a RISC instruction set architecture, such as an Advanced RISC Machine (ARM) architecture.

As illustrated in FIG. 1, each of the first processing cluster A 110 and the second processing cluster B 120 also includes a system memory 112, 122, respectively, an operating system 114, 124, respectively, and a cache 119, 129, respectively. The processing system 100 further includes a communications infrastructure 102, and one or more applications 150. Access to system memories 112, 122 is managed by one or more memory controllers (not shown), which are coupled to memories 112, 122. For example, requests from the processing cluster A 110 or the processing cluster B 120 or other devices for reading from or for writing to system memories 112, 122 are managed by the memory controller. In some embodiments, the one or more applications 150 include various programs or commands to perform computations that are also executed at one or both of the processing cluster A 110 and the processing cluster B 120. The processing system 100 further includes a motherboard 104 that provides power and support to at least the processing cluster A 110 and the processing cluster B 120, a memory management unit, such as an input/output memory management unit (IOMMU) 140 and a power management unit 160. Components of processing system 100 may be implemented as hardware, firmware, software, or any combination thereof. In some embodiments the processing system 100 includes one or more software, hardware, and firmware components in addition to or different from those shown in FIG. 1.

Within each of the processing cluster A 110 and the processing cluster B 120, the system memories 114, 124 include non-persistent memory, such as dynamic random-access memory (DRAM) (not shown). In various embodiments, the system memories 112, 122 store processing logic instructions, constant values, variable values during execution of portions of applications or other processing logic, or other desired information. For example, in various embodiments, parts of control logic to perform one or more operations at processing cluster A 110 and processing cluster B 120 reside within system memories 112, 122 during execution of the respective portions of the operation by processing cluster A 110 and processing cluster B 120. During execution, respective applications, operating system functions, processing logic commands, and system software reside in system memories 112, 122, respectively. Control logic commands that are fundamental to operating systems 114, 124 generally reside in system memories 112, 122, respectively, during execution. In some embodiments, other software commands (e.g., a device driver) also reside in system memories 112, 122 during execution of processing system 100.

The IOMMU 140 includes logic to perform virtual to physical address translation for memory page access for devices, such as the processing cluster A 110 and the processing cluster B 120. In some embodiments, the IOMMU 140 also includes, or has access to, a translation lookaside buffer (TLB) 142. The TLB 142, as an example, is implemented in a content addressable memory (CAM) to accelerate translation of logical (i.e., virtual) memory addresses to physical memory addresses for requests made by the processing cluster A 110 and the processing cluster B 120 for data in system memories 112, 122.

In various embodiments, the communications infrastructure 102 interconnects the components of processing system 100. Communications infrastructure 102 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 102 also includes an Ethernet network or any other suitable physical communications infrastructure that satisfies an application's data transfer rate requirements. Communications infrastructure 102 also includes the functionality to interconnect components, including components of processing system 100.

The processing cluster A 110 includes processing cores A-1 115, A-2 116, A-3 117, and A-4 118 and the processing cluster B 120 includes processing cores B-1 125, B-2 126, B-3 127, and B-4 128. One or more of the processing cores 115-118 and 125-128 includes (not shown) one or more of a control processor, field programmable gate array (FPGA), application specific integrated circuit (ASIC), or digital signal processor (DSP). One or more of the processing cores 115-118 and 125-128 executes at least a portion of the control logic that controls the operation of the processing system 100. For example, in various embodiments, one or more of the processing cores 115-118 and 125-128 execute the operating systems 114, 124 and the one or more applications 150. In some embodiments, one or more of the processing cores 115-118 and 125-128 executes commands and programs for selected functions, such as graphics operations and other operations that are particularly suited for parallel processing.

In general, the processing cluster B 120 is frequently used for executing graphics pipeline operations, such as pixel operations, geometric computations, and rendering an image to a display, such as for computer vision. Computer vision allows computers to extract high-level information from digital images by automating tasks that correspond to similar tasks performed by a human visual system. Examples of computer vision tasks include object recognition, motion analysis, scene reconstruction, and image restoration. Computer vision techniques include two complementary tasks: (1) acquiring one or more digital images and (2) processing the acquired images to generate high dimensional data that represents an "understanding" of the information in the digital images. Image acquisition is performed by one or more image sensors or cameras, as well as range sensors, depth sensors, tomography devices, radar, ultrasonic cameras, and the like. The digital image can be an ordinary two-dimensional (2D) image, a three-dimensional (3D) volume, or a combination of one or more of the 2D images and 3D volumes. Processing the acquired images involves one or more of pre-processing (for example, to reduce noise), feature extraction, and detection and segmentation. Computer vision tasks are generally more efficiently handled by processors implementing a RISC instruction set architecture, such as an Advanced RISC Machine (ARM) architecture. In some embodiments, the processing cluster B 120 also executes compute processing operations (e.g., those operations unrelated to graphics such as video operations, physics simulations, computational fluid dynamics, etc.).

The number of processing cores 115-118 and 125-128 that are implemented in each of the processing cluster A 110 and the processing cluster B 120 is a matter of design choice. Each of the processing cores 115-118 and 125-128 includes one or more processing elements such as scalar and/or vector floating-point units, arithmetic and logic units (ALUs), and the like. In various embodiments, the processing cores 115-118 and 125-128 also include special purpose processing units (not shown), such as inverse-square root units and sine/cosine units.

The power management unit 160 is configured to implement power states for certain components of the processing system 100 in accordance with one or more power state specifications, such as in accordance with the Advanced Configuration and Power Interface (ACPI) specification. For example, to implement a power state asserted by an OS 114, 124 or other component, the power management unit 160 is able to change clock frequencies for one or more components, connect or disconnect one or more components from a power rail (not shown), change a voltage supplied to one or more components, or combinations thereof.

The bootloader 130 performs core initialization of the hardware of the processing system 100 and loads the operating systems 114, 124 of the processing cluster A 110 and the processing cluster B 120, respectively. The bootloader 130 then hands control to the operating systems 114, 124, which initialize themselves and configure the system hardware by, for example, setting up memory management, setting timers and interrupts, and loading device drivers.

The bootloader 130 includes a boot memory 135 configured to store a Basic Input/Output System (BIOS) 133 and a hardware-A configuration 132 indicating the hardware configuration of the processing system 100 for the processing cluster A 110. In some embodiments, the boot memory 135 is implemented as a read only memory (ROM) that stores boot code for execution during a boot process that is initiated upon a power-on reset. Booting refers to any of a variety of initialization specifications or processes, BIOS, extensible firmware interface (EFI), unified EFI (UEFI), and the like. In some embodiments, the hardware-A configuration 132 includes a start-up service such as an ACPI framework. The hardware-A configuration 132 provides hardware registers to the components powered by the motherboard 104 to enable power management and device operation without directing calling each component natively such as by a hardware address. The hardware-A configuration 132 serves as an interface layer between the BIOS 133 and the OS 114 for the processing cluster A 110.

During a bootstrap process, such as at a power-on reset or other boot initialization event, power is supplied to the motherboard 104. When the motherboard 104 first receives power, the boot memory 135 is activated and completes its setup, initialization, and self-tests including a power-on self-test (POST). The BIOS 133 then uses information obtained during firmware initialization to create or update tables of the hardware-A configuration 132 with various platform and device configurations including power interface data.

During the boot process, the BIOS 133 identifies all available storage devices of the processing cluster A 110 for potential boot devices that may have an OS for the processing cluster A 110. The BIOS 133 uses a boot order specified in a persistent storage available to the motherboard 104. On some motherboards, the persistent storage is in a separate chip. In many instances, the BIOS persistent storage is integrated with a real-time clock (RTC) or with an integrated circuit (IC) on the motherboard 104 that is responsible for a hard drive controller, an I/O controller, and integrated components. In some embodiments, the BIOS persistent storage is provided with its own power source in the form of a battery which allows the BIOS persistent storage to maintain the boot order even if the motherboard 104 of the hybrid co-processing system 100 loses primary power.

The bootloader 130 includes executable code that loads the OS 114 into the system memory 112 and starts the OS 114. At this point, the BIOS 133 activates the boot loader 130 and stops controlling the motherboard 104 and the hybrid co-processing system 100. The bootloader 130 loads and executes the various components of the OS 114 into the system memory 112 and communicates the hardware-A configuration 132 to the OS 114. During its initialization, the OS 114 starts and initializes a kernel (not shown) to allow the kernel to provide tasks in the form of processor instructions to the processing cores 115-118. The kernel manages execution of processes on the processing cores 115-118.

To facilitate efficient booting of the processing cluster B 120, the bootloader 130 further includes a parser 135 configured to derive a hardware-B configuration 134 indicating the hardware configuration of the processing system 100 for the processing cluster 120 based on the hardware-A configuration 132. The hardware-A configuration 132 is a description of the hardware configuration of the hybrid co-processing system 100, such as memory configuration, I/O devices, device locations, device capabilities, and custom bootstrings, that is relevant to the OS 114 running at the processing cluster A 110. The hardware-B configuration 134 is a description of the hardware configuration of the hybrid co-processing system 100 that is relevant to the OS 124 running at the processing cluster B 120. Because the processing cluster A 110 has a different architecture type than the processing cluster B 120, the hardware-A configuration 132 differs from the hardware-B configuration 134.

Generating both the hardware-A configuration 132 and the hardware-B configuration 134 independently of one another is inefficient, and using the hardware-A configuration 132 for the OS 124 running at the processing cluster B 120 (or using the hardware-B configuration 134 for the OS 114 running at the processing cluster A 110) introduces unnecessary constraints on the OS 124 (or insufficient information for the OS 114). Accordingly, the parser 136 derives the hardware-B configuration 134 from the hardware-A configuration 132. In some embodiments, the parser 136 derives the hardware-B configuration 134 by logically pruning, restricting, or adding information specific to the architecture of the processing cluster B 120 to the information contained in the hardware-A configuration 132. By deriving the hardware-B configuration 134 from the hardware-A configuration 132, the parser 136 leverages the information contained in the hardware-A configuration 132 and customizes the information to the needs of the OS 114 in the architectural context of the processing cluster B 120, facilitating a more efficient bootstrap process.

In some embodiments, the hardware-A configuration 132 includes a trusted memory region (TMR) that is only applicable to the OS 114 in the architectural context of the processing cluster B 120. The TMR region of the hardware-A configuration 132 is not exposed to the OS 112 running at the processing cluster A 110.

Based on the hardware-B configuration 134, the bootloader 130 loads the OS 124 into the system memory 122 and starts the OS 124. In some embodiments, the bootloader 130 loads the OS 124 into the system memory 122 and starts the OS 124 in parallel with loading the OS 114 into the system memory 112 and starting the OS 114. The bootloader 130 communicates the hardware-B configuration 134 to the OS 124. During its initialization, the OS 124 starts and initializes a kernel (not shown) to allow the kernel to provide tasks in the form of processor instructions to the processing cores 125-128. The kernel manages execution of processes on the processing cores 125-128.

FIG. 2 is a block diagram of the bootloader 130 of FIG. 1 including a parser 136 for parsing an advanced configuration and power interface (ACPI) table 232 indicating a hardware configuration of the hybrid co-processing system 100 that is used to boot a CISC architecture-based processing cluster (not shown) into a device tree 234 indicating a hardware configuration of the hybrid co-processing system 100 that is used to boot a RISC architecture-based processing cluster (not shown) in accordance with some embodiments. The ACPI table 232 includes a trusted memory region 233, which includes a listing of hardware 210 and corresponding parameters 212. The trusted memory region 233 is not exposed to the CISC architecture-based processing cluster. For example, in some embodiments the hardware 210 includes storage such as system memory, caches, frame buffers, and local shared memories, I/O devices, and peripheral devices. In some embodiments, the corresponding parameters 212 include memory configuration, device locations, device capacities, device capabilities, and custom bootstrings. The information contained in the ACPI table 232 is specific to the needs of an OS executing at the CISC architecture-based processing cluster, for example, for a Linux or Windows OS executing at an x86-based processing cluster.

The parser 136 is configured to translate the hardware configuration information of the ACPI table 232 into device nodes in the device tree 234, which includes information specific to the needs of an OS executing at the RISC architecture-based processing cluster, for example, for a Linux OS executing at an ARM-based processing cluster. Based on the differences between the information specific to the needs of the OS executing at the RISC architecture-based processing cluster and the information specific to the needs of the OS executing at the CISC architecture-based processing cluster, the parser 136 derives the device tree 234 by logically pruning or restricting information from the ACPI table 232, or adding information specific to the RISC architecture to the information contained in the ACPI table 232. For example, in some embodiments, the parser 136 extracts from the trusted memory region 233 an extended peripheral component interconnect (PCI-E) root complex and information relating to peripherals, such as USB, universal asynchronous receiver/transmitter (UART), and general purpose input/output (GPIO) devices, that is only applicable to the RISC architecture-based processing cluster. Each node of the device tree 234 is also referred to as a device node. A device node includes device objects for each device's drivers (not shown), as well as internal information maintained by the RISC architecture-based processing cluster. The device tree 234 is hierarchical, with devices on a bus or interconnect device represented as "children" of the bus or interconnect. The hierarchy of the device tree 234 reflects the structure in which the devices are connected within the hybrid co-processing system 100. In some embodiments, the parser 136 derives a device tree source file (not shown) from the ACPI table 232, which is compiled into a device tree blob (not shown). The device tree blob is loaded by the bootloader 130 and parsed by a kernel (not shown) at boot time.

In the illustrated example, the device tree 234 includes a tree root 250, which is depicted as a parent node to a CPU 255 node, a GPU 260 node, and a memory 265 node. The CPU 255 node is depicted as a parent node to a core 1 257 and a core 2 259. The GPU node 260 is depicted as a parent node to a compute unit 1 262 and a compute unit 2 264. The memory 265 node is depicted as a parent node to a double data rate (DDR) synchronous dynamic random access memory device 267 node. Thus, the device tree 234 describes the hardware layout and capabilities of, for example, the processing cluster B 120.

FIG. 3 is a flow diagram illustrating a method 300 for booting a hybrid co-processing system 100 of FIGS. 1 and 2 including clusters of CISC architecture-based processors and RISC architecture-based processors by parsing a hardware configuration such as an ACPI table for an operating system running at the cluster of CISC architecture-based processors into a hardware configuration such as a device tree for an operating system running at the cluster of RISC architecture-based processors in accordance with some embodiments. At block 302, the hybrid co-processing system 100 supplies power to the motherboard 104. At block 304, when the motherboard 104 receives power, the motherboard 104 activates the boot memory 135 and the boot memory 135 conducts setup, firmware initialization, and self-tests such as a power-on self-test (POST). At block 306, the BIOS 133 uses information obtained during firmware initialization to create or update tables of the hardware-A configuration 132 with various platform and device configurations including power interface data specific to the OS 114 at the processing cluster A 110.

At block 308, the parser 136 derives from the ACPI table 232 a device tree 234 for the OS 124 at the processing cluster B 120. In some embodiments, the parser 136 derives the device tree 234 by logically pruning or restricting information from the ACPI table 232, or by adding information specific to the RISC architecture to the information contained in the ACPI table 232. At block 310, the bootloader 130 identifies a boot device storing the OS 114 for the processing cluster A 110 and a boot device storing the OS 124 for the processing cluster B 120. In some embodiments, the booting of the processing cluster A 110 and booting of the processing cluster B 120 proceed independently of each other after the parser 136 derives the device tree 234 from the ACPI table 232. The BIOS 133 uses a boot order specified in a persistent storage available to the motherboard 104. At block 312, the bootloader 130 executes code that loads the OS 114 into the system memory 112 and starts the OS 114, at which point the BIOS 133 stops controlling the motherboard 104. At block 314, the bootloader 130 loads the OS 124 into system memory 114 for the processing cluster B 120. In some embodiments, the bootloader 130 performs the actions of blocks 312 and 314 in parallel. At block 316, the bootloader 130 communicates the ACPI table 232 to the OS 114. In some embodiments, the bootloader 130 employs a pointer to communicate the ACPI table 232 to the OS 114. At block 318, the bootloader 130 communicates the device tree 234 to the OS 124. In some embodiments, the bootloader 130 employs a pointer to communicate the device tree 234 to the OS 124. In some embodiments, the bootloader 130 performs the actions of blocks 316 and 318 in parallel.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    communicating, at a bootloader of a hybrid co-processing system comprising a first processing cluster of a first architecture type and a second processing cluster of a second architecture type, a first hardware configuration of the hybrid co-processing system specific to the first architecture type to a first operating system at the first processing cluster during boot up of the hybrid co-processing system;
    deriving, at the bootloader, a second hardware configuration of the hybrid co-processing system specific to the second architecture type based on the first hardware configuration; and
    communicating, during boot up of the hybrid co-processing system, the second hardware configuration to a second operating system at the second processing cluster.

2. The method of claim 1, wherein the first architecture type comprises a complex instruction set architecture.

3. The method of claim 2, wherein the first hardware configuration is based on an advanced configuration and power interface (ACPI) table.

4. The method of claim 1, wherein the second architecture type comprises a reduced instruction set architecture.

5. The method of claim 3, wherein deriving comprises parsing a device tree based on the ACPI table.

6. The method of claim 1, wherein deriving comprises at least one of: logically pruning, restricting, or adding information specific to the second architecture type.

7. The method of claim 1, wherein the first hardware configuration and the second hardware configuration comprise at least one of: memory configuration, input/output configuration, device capabilities, peripheral devices, and custom bootstrings.

8. A method, comprising:
    booting a hybrid co-processing system comprising a first processing cluster of a first architecture type and a second processing cluster of a second architecture type, wherein booting comprises:
        converting, at a bootloader, a first hardware configuration of the hybrid co-processing system based on the first architecture type to a second hardware configuration of the hybrid co-processing system based on the second architecture type; and
        providing the first hardware configuration to a first operating system at the first processing cluster and providing the second hardware configuration to a second operating system at the second processing cluster.

9. The method of claim 8, wherein the first architecture type comprises a complex instruction set architecture.

10. The method of claim 9, wherein the first hardware configuration is based on an advanced configuration and power interface (ACPI) table.

11. The method of claim 10, wherein converting comprises parsing a device tree based on the ACPI table.

12. The method of claim 8, wherein the second architecture type comprises a reduced instruction set architecture.

13. The method of claim 8, wherein converting comprises at least one of: logically pruning, restricting, or adding information specific to the second architecture type.

14. The method of claim 8, wherein the first hardware configuration and the second hardware configuration comprise at least one of: memory configuration, input/output configuration, device capabilities, peripheral devices, and custom bootstrings.

15. A device, comprising:
    a first processing cluster of a first architecture type;
    a second processing cluster of a second architecture type; and
    a bootloader configured to:
        communicate a first hardware configuration of the device specific to the first architecture type to a first operating system at the first processing cluster during boot up of the device;
        derive a second hardware configuration of the device specific to the second architecture type based on the first hardware configuration; and
        communicate, during boot up of the device, the second hardware configuration to a second operating system at the second processing cluster.

16. The device of claim 15, wherein the first architecture type comprises a complex instruction set architecture.

17. The device of claim 16, wherein the first hardware configuration is based on an advanced configuration and power interface (ACPI) table.

18. The device of claim 17, wherein the bootloader is configured to parse a device tree based on the ACPI table.

19. The device of claim 15, wherein the second architecture type comprises a reduced instruction set architecture.

20. The device of claim 15, wherein the bootloader is configured to perform at least one of: logically pruning, restricting, or adding information specific to the second architecture type to the first hardware configuration.

* * * * *